United States Patent
Hindel et al.

(10) Patent No.: US 7,556,221 B2
(45) Date of Patent: Jul. 7, 2009

(54) AIRCRAFT ICE PROTECTION METHOD

(75) Inventors: James T. Hindel, Tallmadge, OH (US);
Michael J. Dorsey, Uniontown, OH (US); James C. Putt, Doylestown, OH (US); Kyle H. Deiwert, Stow, OH (US)

(73) Assignee: Goodrich Corporation, Charlotte, NC (US)

( * ) Notice: Subject to any disclaimer, the term of this patent is extended or adjusted under 35 U.S.C. 154(b) by 189 days.

(21) Appl. No.: 11/769,774

(22) Filed: Jun. 28, 2007

(65) Prior Publication Data

US 2008/0156937 A1 Jul. 3, 2008

Related U.S. Application Data

(60) Provisional application No. 60/806,042, filed on Jun. 28, 2006.

(51) Int. Cl.
*B64D 15/00* (2006.01)
(52) U.S. Cl. .............. 244/134 D; 244/134 R; 219/202
(58) Field of Classification Search ............ 244/134 D, 244/134 B, 134 R; 219/200, 50, 202
See application file for complete search history.

(56) References Cited

U.S. PATENT DOCUMENTS

| | | | |
|---|---|---|---|
| 2,496,279 A | 2/1950 | Ely et al. |
| 2,757,273 A | 7/1956 | Taylor |
| 2,762,897 A | 9/1956 | Vrooman et al. |
| 2,992,317 A | 7/1961 | Hoffman |
| 3,002,718 A | 10/1961 | Hackenberger, Jr. |
| 3,013,752 A | 12/1961 | Rush |
| 3,022,412 A | 2/1962 | Waters |
| 3,204,084 A | 8/1965 | Spencer, Jr. et al. |
| 3,420,476 A | 1/1969 | Volkner et al. |
| 4,386,749 A | 6/1983 | Sweet et al. |
| 4,814,931 A | 3/1989 | Kugelman et al. |
| 5,412,181 A | 5/1995 | Giamati |
| 5,475,204 A | 12/1995 | Giamati et al. |
| 5,657,951 A | 8/1997 | Giamati |
| 5,904,322 A | 5/1999 | Giamati et al. |
| 6,129,314 A | 10/2000 | Giamati et al. |
| 6,283,411 B1 | 9/2001 | Giamati et al. |
| 6,338,455 B1 | 1/2002 | Rauch et al. |
| 7,246,773 B2 | 7/2007 | Stoner et al. |
| 7,278,610 B2 | 10/2007 | Giamati |

(Continued)

FOREIGN PATENT DOCUMENTS

EP 0680878 11/1995

(Continued)

OTHER PUBLICATIONS

GB0712537.0; Search Report dated Sep. 16, 2007.

*Primary Examiner*—J. Woodrow Eldred
(74) *Attorney, Agent, or Firm*—Renner, Otto, Boisselle & Sklar

(57) ABSTRACT

A method of removing a delay-induced ice accumulation (e.g., an ice cap) from an airfoil's leading-edge region with a zoned electrothermal device. The method comprises delay-rectifying steps which are performed prior to routine-deicing steps. The delay-rectifying steps comprise continuously heating the parting strip (PS), continuously heating the upper fore zone (UF1), and continuously heating the lower fore zone (LF1). These steps efficiently and effectively remove the delay-induced ice accumulation, whereby routine deicing can be resumed.

19 Claims, 5 Drawing Sheets

| U.S. PATENT DOCUMENTS | | | FOREIGN PATENT DOCUMENTS | | |
|---|---|---|---|---|---|
| 2005/0006529 A1 | 1/2005 | Moe et al. | EP | 0865903 | 9/1998 |
| 2005/0184193 A1 | 8/2005 | Bourjac et al. | GB | 662540 | 12/1951 |
| 2006/0043240 A1 | 3/2006 | Hindel et al. | GB | 666609 | 2/1952 |
| 2007/0075188 A1 | 4/2007 | Stoner et al. | GB | 1110217 | 4/1968 |
| 2007/0102582 A1 | 5/2007 | Botura et al. | GB | 1115023 | 5/1968 |
| 2007/0194179 A1 | 8/2007 | Giamati | GB | 1117843 | 6/1968 |

AIRCRAFT ICE PROTECTION METHOD

RELATED APPLICATION

This application claims priority under 35 U.S.C. §119 (e) to U.S. Provisional Patent Application No. 60/806,042, filed on Jun. 28, 2006. The entire disclosure of this provisional application is hereby incorporated by reference.

GENERAL FIELD

An aircraft ice protection method wherein an electrothermal device is employed to perform anti-icing steps and deicing steps.

BACKGROUND

An aircraft ice protection method commonly comprises anti-icing steps and deicing steps designed to defend an airfoil from undue ice accumulation during flight. An electrothermal device is disposed on, and/or integrated into, the airfoil. Ice protection steps are performed by controlling the initiation, the duration, and/or the level of electrical power supplied to device's heating elements.

During anti-icing steps, the electrothermal device continuously heats an airfoil region to a temperature above freezing, whereby ice cannot form thereon. During deicing steps, the electrothermal device intermittently heats an airfoil region on which ice has been allowed to accumulate. The to-be-deiced region need only be heated enough to melt the adhesion layer between the airfoil surface and the accumulated ice. Once this airfoil-to-ice bond is broken, the ice fragments into pieces which are easily swept away by the oncoming airstream.

Deicing is more power affordable than anti-icing because intermittent heating steps require significantly less electrical energy than continuous heating steps. And intermittent steps allow staggered zone-heating whereby power draws can be somewhat regularized. If deicing is not appropriate for an airfoil region (e.g., the leading edge region), the corresponding heating area of the electrothermal device (e.g., the parting strip) is usually sized as small as possible to conserve power.

SUMMARY

An aircraft ice protection method is provided which addresses ice accumulation formed when there is a delay between the onset of icing conditions and the start of ice protection steps. During a delay, an incessant ice mass (e.g., a solid ice cap) can rapidly grow on the airfoil. After about two minutes, this growth can extend across the airfoil's leading edge region and bridge between its upper/lower fore regions. With the present method, delay-rectifying steps efficiently and effectively remove such an ice cap so that routine deicing steps can be resumed. This removal is achieved without enlarging the size of the parting strip and thus without increasing routine-deicing power requirements. The ice protection method can also abide excessive runback resulting from aggressive melting during delay-rectifying steps.

DRAWINGS

DESCRIPTION

Figure 1:
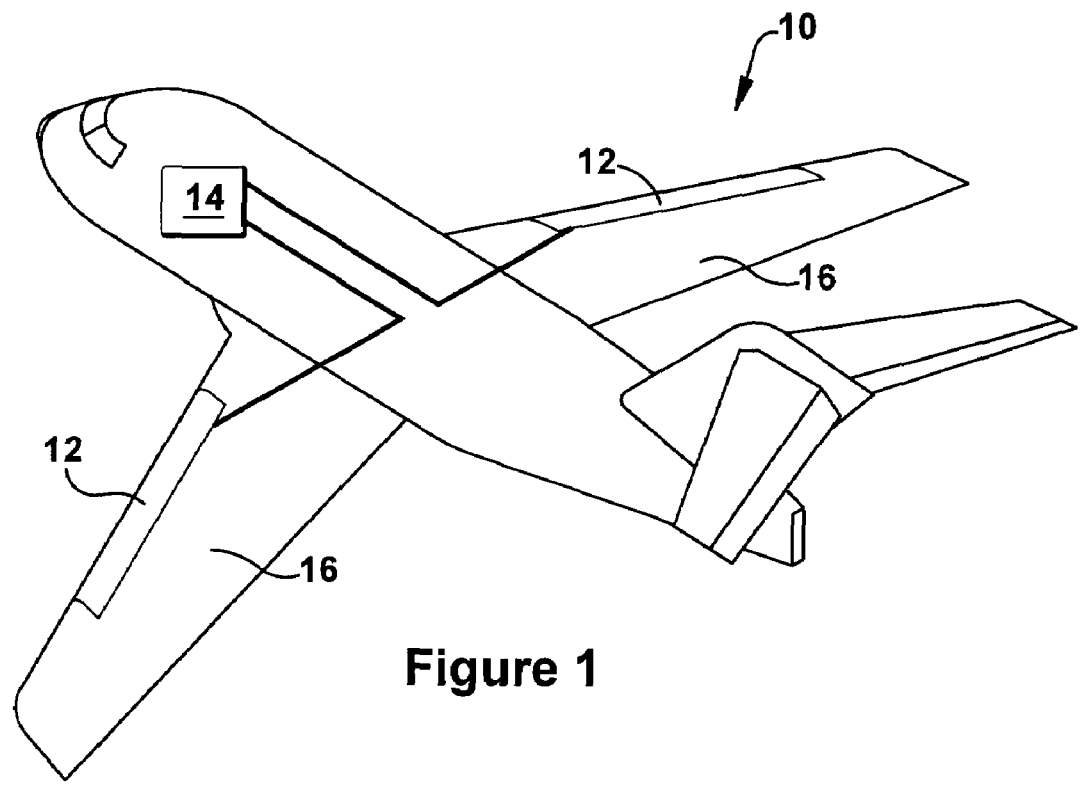
FIG. 1 is a schematic top view of an aircraft having an electrothermal device disposed on each wing.

Referring now to the drawings, and initially to FIG. 1, an aircraft 10 has an ice protection system comprising electrothermal devices 12 and a controller 14. The electrothermal devices 12 can each include a plurality of heating elements which convert electrical power into heat. The controller 14 controls the initiation, the duration, and/or the level of electrical power supplied to the heating elements. At least some these parameters can be determined by temperature inputs, such as the outside air temperature and/or conveyed temperature readings. In the illustrated embodiment, the electrothermal devices 12 are shown disposed on the wings 16 of the aircraft 10. But they could additionally or alternatively be secured to other airfoils, such as stabilizers, engine inlets, rotors and other ice-susceptible aircraft components.

Figure 2:
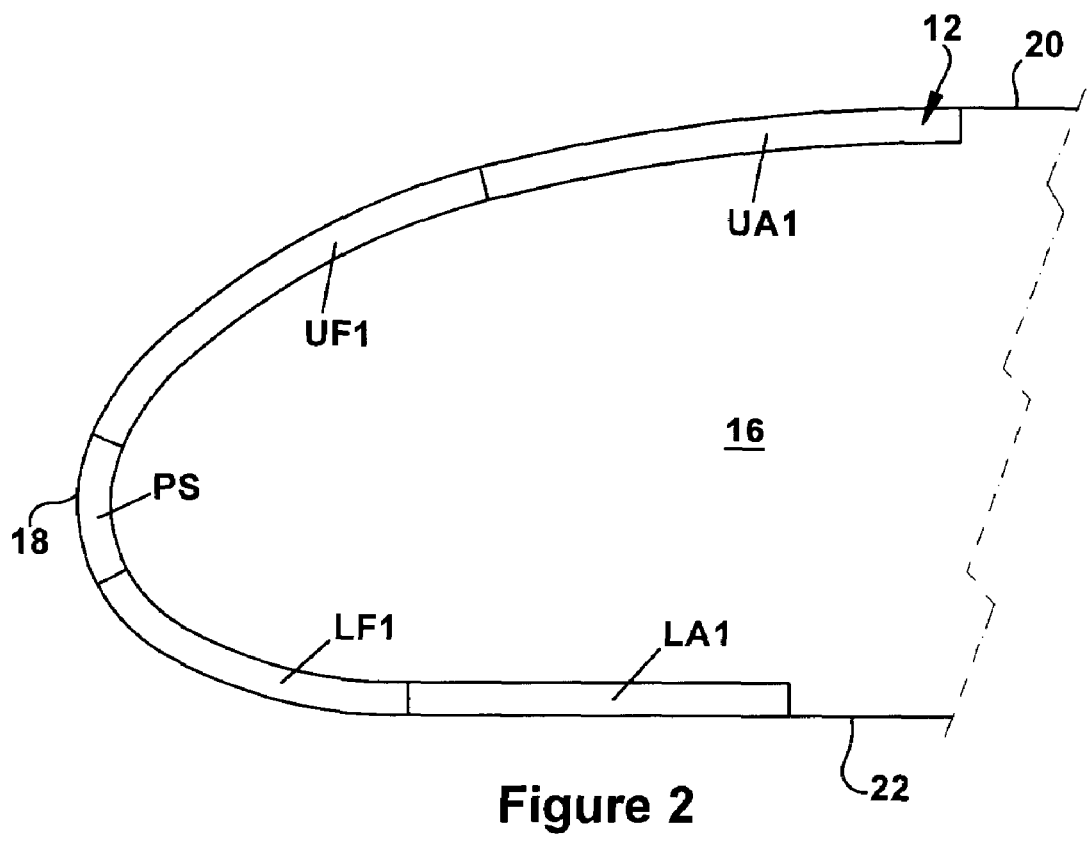
FIG. 2 is a schematic cross view of an airfoil (e.g., the aircraft's wing) and an electrothermal device disposed thereon.

As is shown schematically in FIG. 2, the electrothermal device 12 comprises a spanwise parting strip (PS), and at least a first set of deicing zones (UF1, UA1, LF1, LA). They can comprise an upper fore zone (UF1) adjacent the upper edge of the parting strip (PS), an upper aft zone (UA1) adjacent the aft edge of the upper fore zone (UF1), a lower fore zone (LF1) adjacent the lower edge of the parting strip (PS), and a lower aft zone (LA1) adjacent the aft edge of the lower fore zone (LF1). The deicing zones (UF1, UA1, LF1, LA1) are aligned with each other chordwise and can be the same (as shown) or different sizes.

As is also shown schematically in FIG. 2, the airfoil 16 (e.g., the wing) comprises a leading edge, an upper surface 20, and a lower surface 22.

The electrothermal device 12 is positioned on (or in) the airfoil 16 so that its parting strip (PS) is coterminous with the leading edge region. Deicing steps are generally not considered appropriate for the leading edge region of an airfoil. Even after the airfoil-to-ice bond is broken, ice accumulations will not reliably shed from the leading edge. Instead, the aerodynamic forces of the impinging airflow tend to secure the ice accumulation tightly to the leading edge. Thus, the parting strip (PS) performs anti-icing steps. If power conservation is an objective, the size of the parting strip (PS) can be minimized. For example, the parting strip (PS) can have a width of about 0.5 inch to about 1.0 inch and/or about 12 mm to about 26 mm. (A parting strip's length is usually dictated by a pre-set spanwise dimension.)

The upper surface 20 of the airfoil 16 has a fore region coterminous with the upper fore zone (UF1) and an aft region coterminous with the upper aft zone (UA1). The airfoil's lower surface 22 has a fore region coterminous with the lower fore zone (LF1) and an aft region coterminous with the lower aft zone (LA1). Deicing steps are appropriate for these upper and lower airfoil regions.

Figure 3:
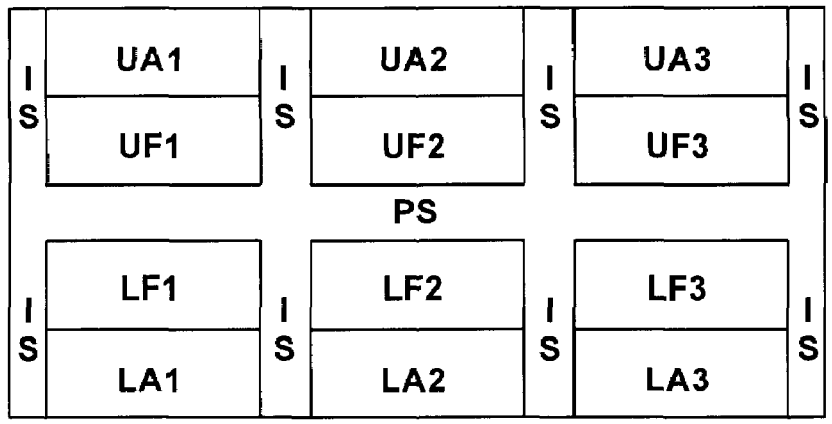
FIG. 3 is a schematic planform view of the electrothermal device.

The electrothermal device 12 can comprise a plurality of sets of deicing zones, such as is shown schematically in FIG. 3. For example, the device 12 can comprise the first set of deicing zones (UF1, LF1, UA1, LA1), a second set of deicing zones (UF2, LF2, UA2, LA2), and a third set of deicing zones (UF3, LF3, UA3, LA3). Each set includes an upper fore zone (UF1, UF2, UF3), a lower fore zone (UL1, UL2, UL3), an upper aft zone (UA1, UA2, UA3), and a lower aft zone (LA1, LA2, LA3). The electrothermal device 14 can include additional sets of zones and/or additional zones in each set. The zones be arranged in a grid-like pattern, with intra-set zones being aligned spanwise and corresponding inter-set zones being aligned chordwise.

The parting strip (PS) extends the span of the zone sets and the upper fore zone (UF1, UF2, UF3) of each set is positioned adjacent the strip's upper edge. The airfoil 16 has upper regions and lower regions coterminous with each of the zones of the electrothermal device. Chordwise anti-icing strips (IS) can be positioned between, and/or on each side of, adjacent inter-set zones. These zone-isolating strips (IS) cause ice to accumulate in a patchwork-like fashion (and not a sheet-like fashion) on the upper/lower surfaces of the airfoil. This isolation insures single-zone anchoring of ice accumulation so that, once the ice-to-airfoil bond is melted in a particular zone, the ice is easily shed.

Figure 4:
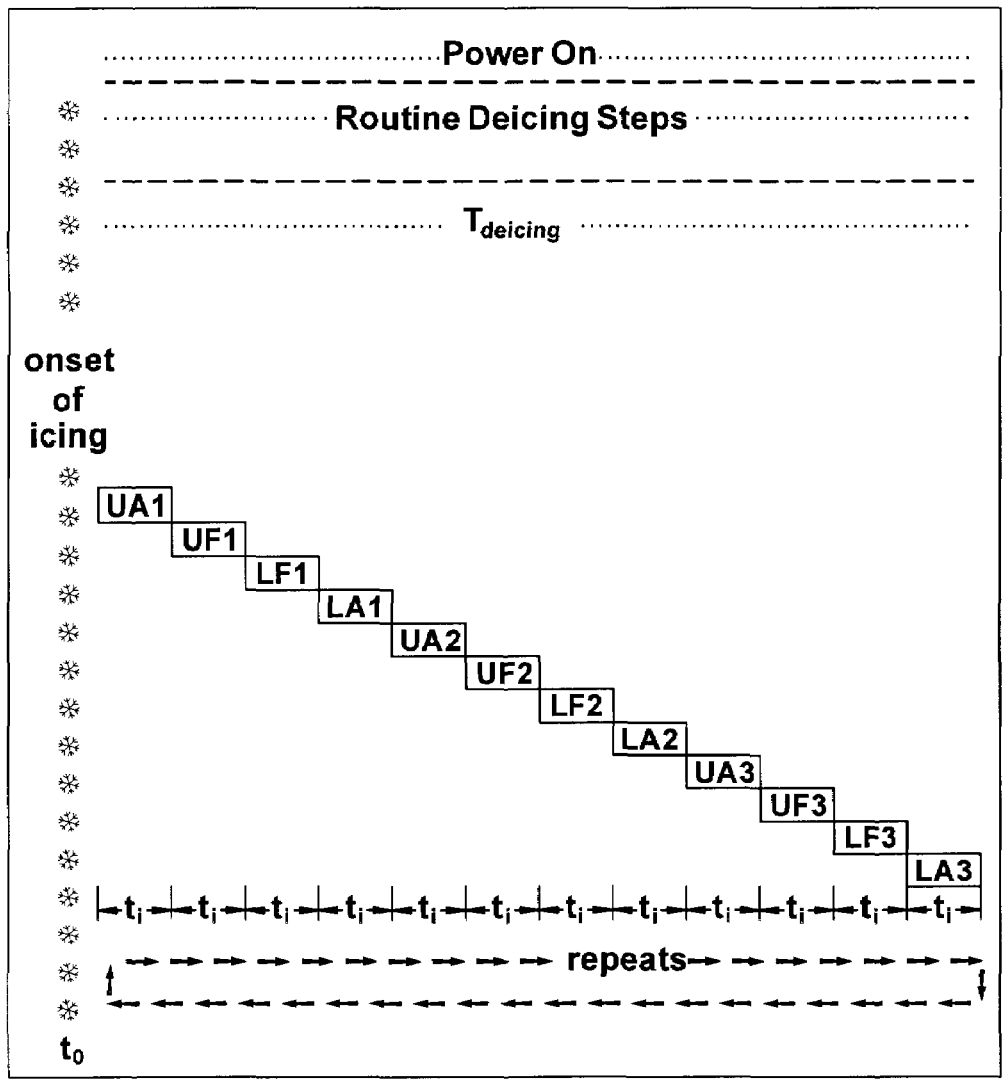
FIG. 4 is a schedule diagram of routine deicing steps.

During normal (i.e., non-delay) operation, routine deicing steps are initiated immediately upon encountering icing conditions. As shown in the illustrative schedule diagramed in FIG. 4, routine-deicing steps can comprise continuously heating the parting strip (PS), and intermittently heating the deicing zones (UA1, UF1, LF1, LA1, UA2, UF2, LF2, LA2, UA3, UF3, LF3, LA3).

The parting strip (PS) can be heated to a temperature $T_{deicing}$ which maintains the leading edge region just above freezing. This temperature $T_{deicing}$ can be determined by the controller 14 correlating an outside air temperature reading with predetermined setpoints stored in its memory. The zone-isolating strips (IS) can also be continuously heated during routine-deicing steps and anti-ice in an analogous manner.

The intermittent-heating steps can be staggered for the purposes of power draw regulation. This staggering can be such that three or less zones are heated at the same time, two or less zones are heated at the same time, and/or only one zone is heated at a time (as shown). If the airfoil 16 has a symmetrical partner in the aircraft 10, the left-hand and right-hand deicing steps can mirror each other. The time interval (ti) for each intermittent heating session can be based on an outside air temperature reading, and they can be the same or they can differ from zone to zone. These intervals can be n the range of about 4 seconds to about 60 seconds.

When ice protection steps are immediately initiate upon encountering icy conditions, the formation of an incessant ice mass (e.g., a solid ice cap) on the leading edge region is not an issue. The continuous heating of the spanwise parting strip (PS) during routine-deicing prevents ice from forming thereon. This anti-ice area also provides an interruption between upper-fore-ice accumulation and lower-fore-ice accumulation, whereby these accumulations cannot consolidate.

Figure 5:
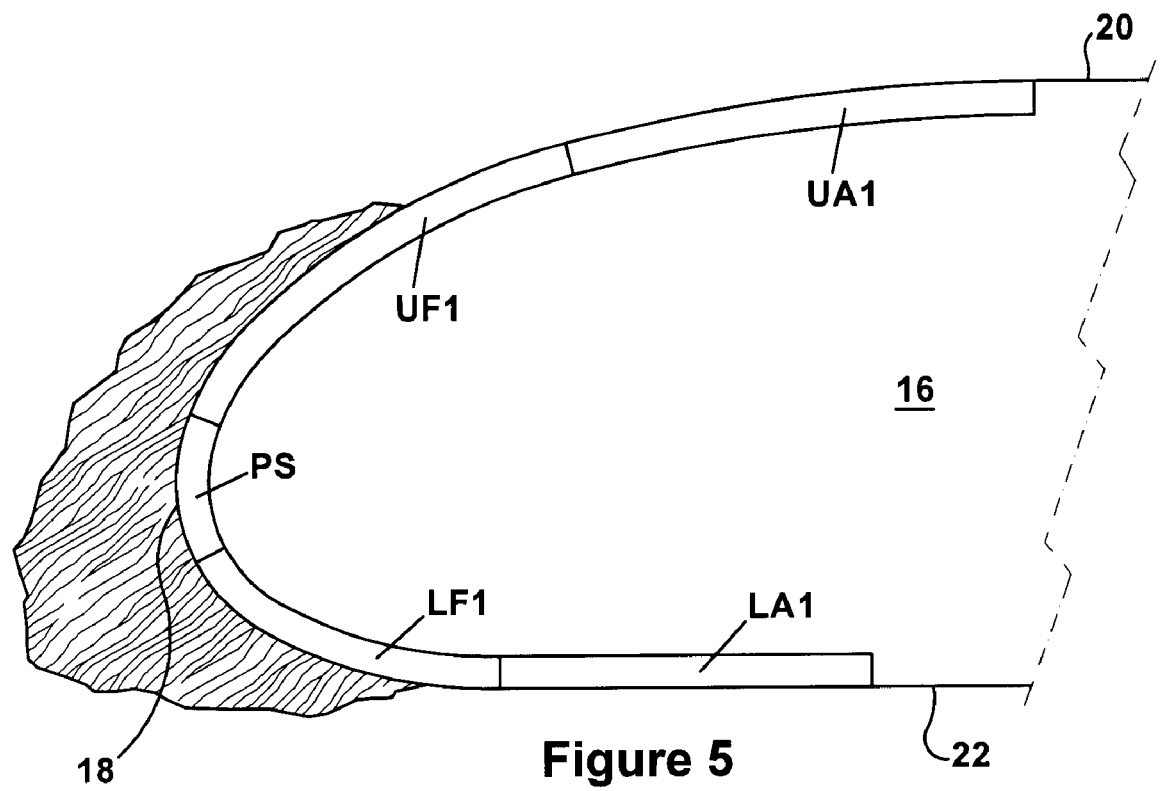
FIG. 5 is a schematic cross view of the airfoil with an incessant ice mass (e.g., an ice cap) formed thereon.

Ice-cap-formation becomes a concern when there is a delay between the onset of icing conditions and the start of ice protection steps. If ice protection steps are delayed, the leading edge 18 will subjected to icing conditions with an unheated parting strip (PS). Ice will accumulate on the leading edge 18, which is undesirable in and of itself. But the absence of an anti-ice interruption between the airfoil's upper/lower fore regions will add insult to injury. Without this interruption, upper-fore ice and lower-fore ice (and leading-edge ice) consolidate into a single incessant mass (e.g., a solid ice cap). After a two minute delay, an ice cap can extend across the leading edge region and bridge between the airfoil's upper and lower fore regions, as shown in FIG. 5.

Figure 6:
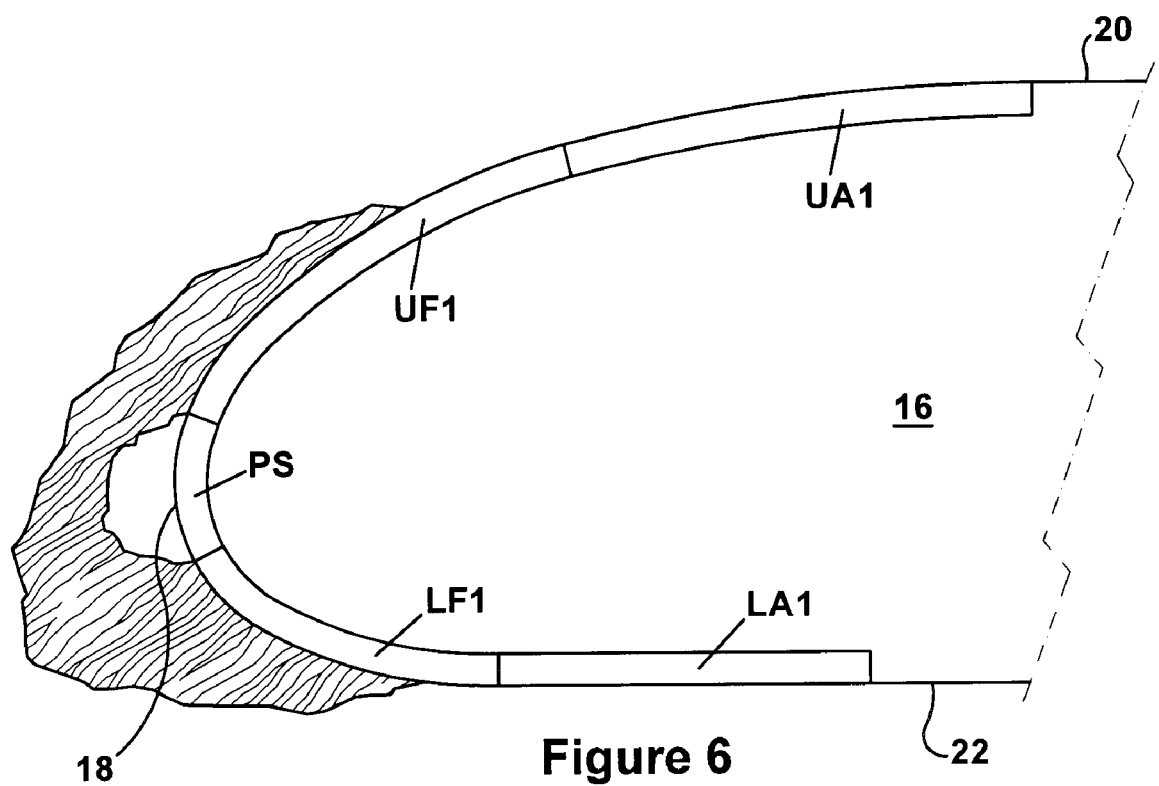
FIG. 6 is a schematic cross view of the airfoil shown in FIG. 5 when routine deicing steps are initially performed.
Figure 7:
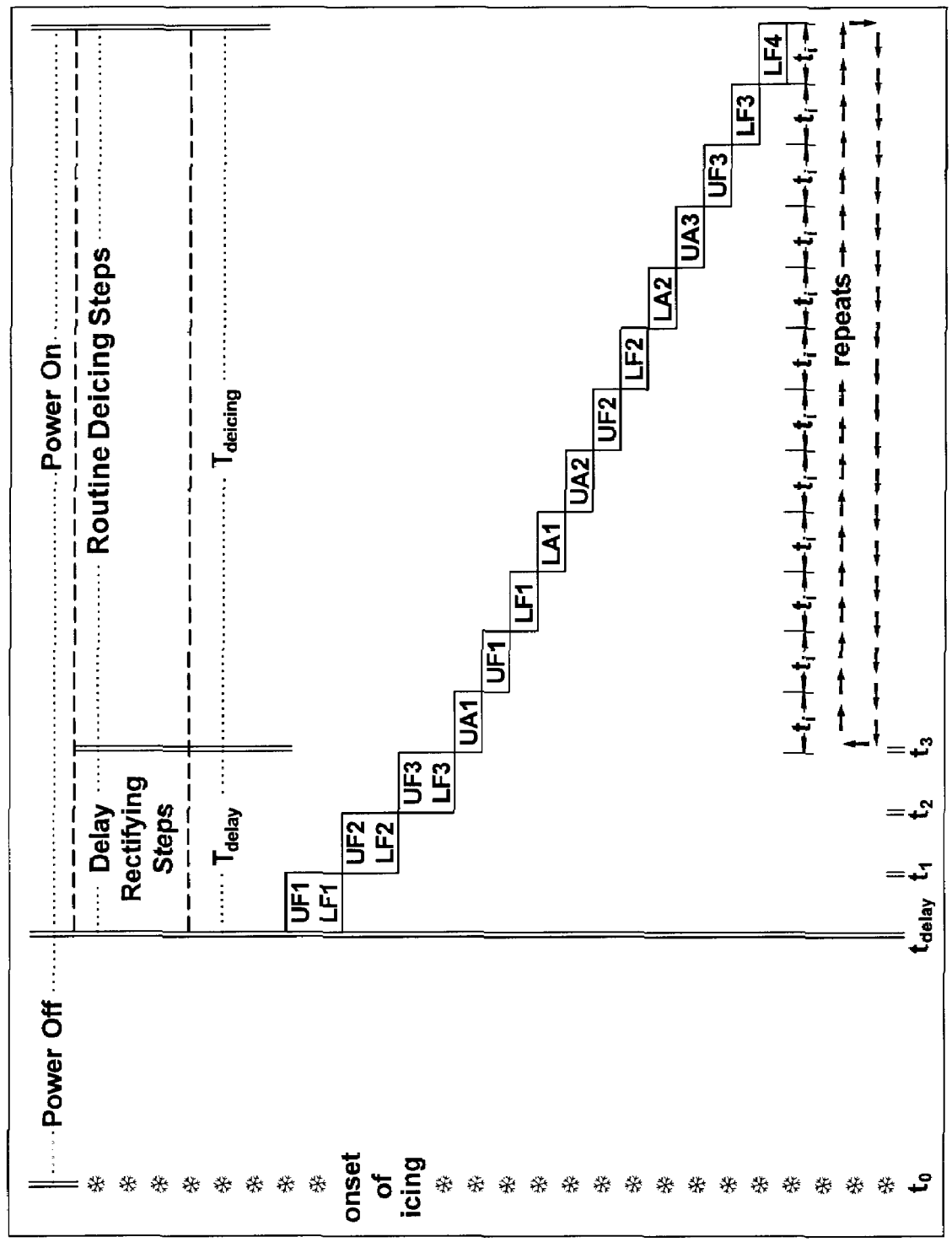
FIG. 7 is a schedule diagram of delay-rectifying steps and the routine deicing steps that follow thereafter.

If routine deicing steps are initiated in response to a delay, the parting strip (PS) will be continuously heated and the deicing zones will be intermittently heated. The continuously heated parting strip (PS) can carve a pocket in the base of the ice cap, as shown in FIG. 6. If the routine-deicing temperature $T_{deicing}$ of the parting strip (PS) is selected to maintain the leading edge region just above freezing, the parting strip's help with further ice-cap melting may not be substantial. And if the previously-formed pocket fills with air (a poor heat transfer medium), the strip's further contribution to the cause can become questionable.

With routine deicing steps, the upper fore zone (UF) will be intermittently heated. This intermittent heating may be sufficient to melt the ice-to-airfoil bond and temporarily loosen the upper arch of the ice cap from the airfoil. But the lower ice-cap arch is still anchored to the airfoil. And the aerodynamic forces of the oncoming airstream against the ice-cap apex tightly braces the upper/lower ice-cap arches against the airfoil. Shortly after the intermittent heating step, the loosened upper arch will probably again adhere to the airfoil, especially when melted-ice water is trapped thereunder. The same scenario occurs (roughly in reverse) when the lower fore zone (LF) takes its intermittent-heating turn.

Thus, if an aircraft needs to accommodate a delay in ice-protection steps (for regulatory or other reasons), simply resort to routine-deicing steps upon discovery of the delay may not be adequate.

The present ice protection method comprises steps specifically performed to remove delay-induced ice accumulation, and an illustrative schedule of these steps is diagramed in FIG. 6. The delay-rectifying steps are performed upon initiation of ice protection procedures, rather than resorting initially to routine-deicing steps. After resolution of ice-accumulation issues caused by the delay, routine-deicing can be resumed.

For a time period (t1) following the delay, the parting strip (PS) is continuously heated, the first upper fore zone (UF1) is continuously heated, and the first lower fore zone (LF1) is continuously heated. The first upper aft zone (UA1) and the first lower aft zone (LF1) are not heated. The second set of zones (UF2, UA2, LF2, LA2) are not heated and the third set of zones (UF3, UA3, LF3, LA3) are not heated during this first time period (t1).

For a time period (t2) following the time period (t1), the parting strip (PS), are continuously heated, the second upper fore zone (UF2) is continuously heated, and the second lower fore zone (LF2) is continuously heated. The second upper aft zone (UA2) and the second lower aft zone (LA2) are not heated. The first set of zones (UF1, UA1, LF1, LA1) are not heated and the third set of zones (UF3, UA3, LF3, LA3) are not heated.

For a time period (t3) following the second time period (t2), the parting strip (PS) are continuously heated, the third upper fore zone (UF3) is continuously heated, and the third lower fore zone (LF3) is continuously heated. The third upper aft zone (UA3) and the third lower aft zone (LA3) are not heated. The first set of zones (UF1, UA1, LF1, LA1) are not heated and the second set of zones (UF2, UA2, LF2, LA2) are not heated.

Time, temperature, and other parameters are selected so that the recumbent ice-cap-segment is removed from the underlying airfoil area by performance of the associated delay-rectifying step. The parting-strip heating steps can be at delay-rectifying temperature $T_{delay}$ that is greater than the routine-deicing temperature $T_{deicing}$. For example, if the routine-deicing temperature $T_{deicing}$ for a given outside air temperature is 90° F. and/or 20° C., the delay-rectifying temperature $T_{delay}$ for this same outside temperature can be 150° F. and/or 65° C. For a given outside air temperature, the delay-rectifying temperature $T_{delay}$ can be greater than the routine-deicing temperature $T_{deicing}$ by about 20° F. and/or about 5° C., about 30° F. and/or about 11° C., about 40° F. and/or about 16° C., about 50° F. and/or about 22° C. greater, and/or about 60° F. and/or about 27° C.

The delay-rectifying time periods (t1, t2, t3) can be based on the outside air temperature, a leading-edge-temperature reading, and/or the delay-rectifying temperature $T_{delay}$ of the parting strip (PS). Typically, these time periods will be in the range of about 10 seconds to about 60 seconds, although longer or shorter time periods are possible and contemplated. The zone-isolating strips (IP) can also be continuously heated during the delay-rectifying time periods.

Figure 8:
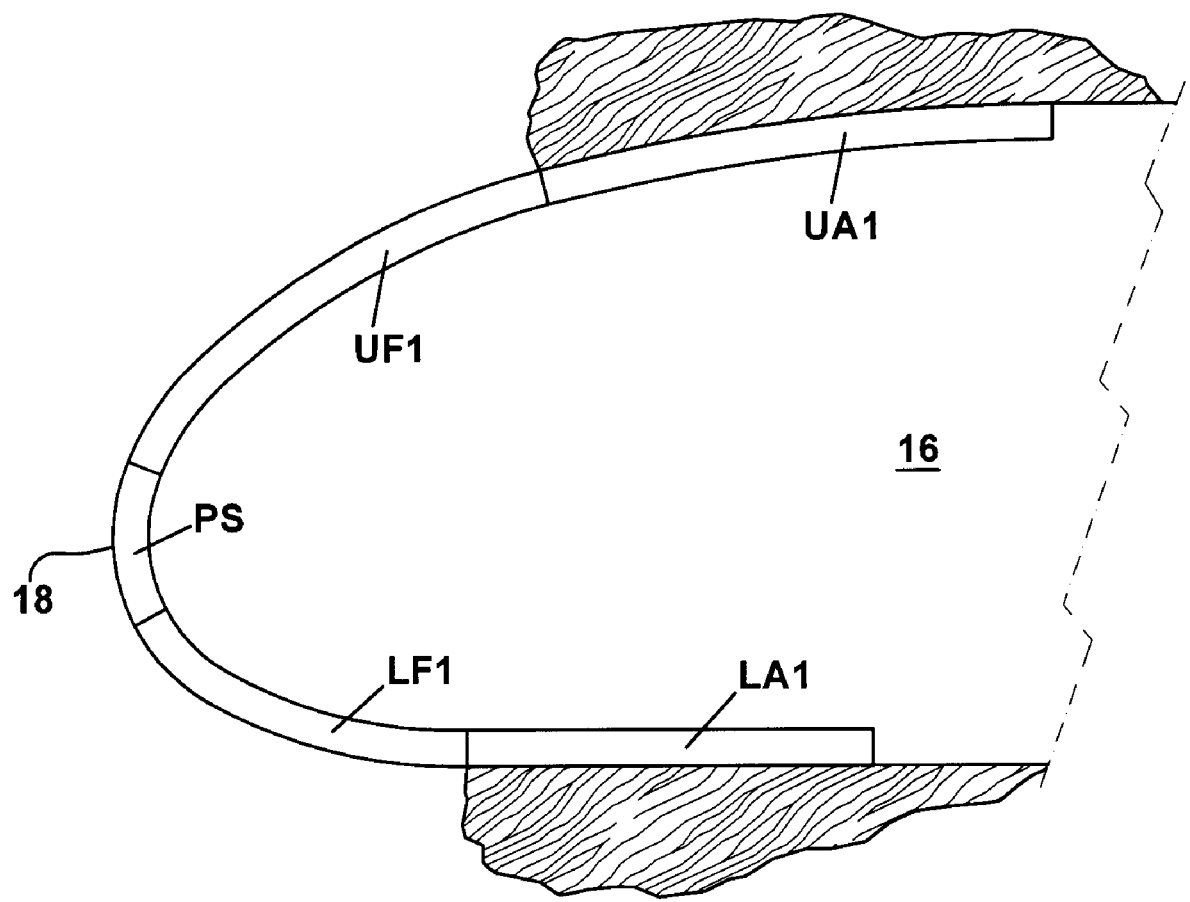
FIG. 8 is a schematic cross view of the airfoil of FIG. 5 when delay-rectifying steps are initially performed.

The upper/lower aft zones (UA/LA) are not heated during delay-rectifying steps, as this desirably reduces power draw requirements. These unheated zones (UA/LA) also allow the ice protection method to indulge excessive runback that may be caused by aggressive delay-rectifying steps. Specifically, runback water from a fore zone (UF/LF) will refreeze when it reaches the unheated aft zones (UA/LA) resulting in the construction of ridges, such as is shown in FIG. 8. These ridges function as temporary damns during delay-rectifying steps to prevent runback water from venturing into unheated areas of the airfoil 16.

After completion of the delay-rectifying steps, routine-deicing steps are resumed.

It may be noted that the parting strip (PS), an upper fore zone (UF) and a lower fore zone (LF) combine during the delay-rectifying steps to essentially provide a unremitting area that is continuously heated. A comparable sequel could possibly be achieved by widening the parting strip (PS) to encompass the same general area. But parting-strip enlargements increase power consumption during routine deicing steps, which are the steps primarily performed during flight. With the present ice protection method, the dimensions of the parting strip (PS) need not be increased to rectify delay-induced ice accumulation.

One may now appreciate that the method allows an ice protection system to perform properly if subjected to a delay (e.g., a two minute delay) when entering icing conditions. Although the ice protection method as been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of protecting an airfoil from undue ice accumulation during flight, said method comprising delay-rectifying steps for removing delay-induced ice accumulation and routine-deicing steps performed after the delay-rectifying steps;
   wherein the delay-rectifying steps and the routine-deicing steps are performed by an electrothermal device comprising a parting strip (PS) and at least a first set of spanwise-aligned deicing zones, the parting strip (PS) being positioned to heat the leading edge region of the airfoil, the first zone set comprising an upper fore zone (UF1), a lower fore zone (LF1), an upper aft zone (UA1), and a lower aft zone (LA1);
   wherein the delay-rectifying steps comprise:
      for a first time period (t1)
         continuously heating the parting strip (PS),
         continuously heating the first upper fore zone (UF1),
         continuously heating the first lower fore zone (LF1),
         not heating the first upper aft zone (UA1),
         not heating the first lower aft zone (LA1),
   wherein the routine-deicing steps comprise:
      continuously heating the parting strip (PS),
      intermittently heating the first upper aft zone (UA1),
      intermittently heating the first lower aft zone (LA1).

2. A method as set forth in claim 1, wherein the routine-deicing steps further comprise:
   intermittently heating the first upper fore zone (UF1);
   intermittently heating the first lower fore zone (LF1).

3. A method as set forth in claim 1, wherein the electrothermal device further comprises a second set of spanwise-aligned deicing zones, the second zone set comprising an upper fore zone (UF2), a lower fore zone (LF2), an upper aft zone (UA2), and a lower aft zone (LA2);
   wherein the delay-rectifying steps further comprise:
      for a second time period (t2) after the first time period (t1):
         continuously heating the parting strip (PS),
         continuously heating the second upper fore zone (UF2),
         continuously heating the second lower fore zone (UL2),
         not heating the second upper aft zone (UA2),
         not heating the second lower aft zone (LA2);
   wherein the routine-deicing steps further comprise:
      intermittently heating the second upper aft zone (UA2),
      intermittently heating the second lower aft zone (LA2).

4. A method as set forth in claim 3, wherein the routine-deicing steps further comprise:
   intermittently heating the first upper fore zone (UF1),
   intermittently heating the first lower fore zone (LF1),
   intermittently heating the second upper fore zone (UF2),
   intermittently heating the second lower fore zone (LF2).

5. A method as set forth in claim 3, wherein the delay-rectifying steps further comprise:
   during the first time period (t1), not heating the second set of zones (UF2, LF2, UA2, LA2);
   during the second time period (t2), not heating the first set of zones (UF1, LF1, UA1, LA1).

6. A method as set forth in claim 5, wherein the routine-deicing steps further comprise:
   intermittently heating the first upper fore zone (UF1),
   intermittently heating the first lower fore zone (LF1),
   intermittently heating the second upper fore zone (UF2),
   intermittently heating the second lower fore zone (LF2).

7. A method as set forth in claim 3, wherein the electrothermal device further comprises a third set of spanwise-aligned deicing zones, the third zone set comprising an upper fore zone (UF3), a lower fore zone (LF3), an upper aft zone (UA3), and a lower aft zone (LA3);
  wherein the delay-rectifying steps further comprise:
    during a third time period (t3) after the second time period (t2),
      continuously heating the parting strip (PS),
      continuously heating the third upper fore zone (UF3),
      continuously heating the third lower fore zone (LF3),
      not heating a third upper aft zone (UA3),
      not heating a third lower aft zone (LA3);
  wherein the routine-deicing steps further comprise:
    intermittently heating the third upper aft zone (UA3),
    intermittently heating the third lower aft zone (LA3).

8. A method as set forth in claim 7, wherein the routine-deicing steps further comprise:
  intermittently heating the first upper fore zone (UF1),
  intermittently heating the first lower fore zone (LF1),
  intermittently heating the second upper fore zone (UF2),
  intermittently heating the second lower fore zone (LF2),
  intermittently heating the third upper fore zone (UF3),
  intermittently heating the third lower fore zone (LF3).

9. A method as set forth in claim 7, wherein the delay-rectifying steps further comprise:
  during the first time period (t1), not heating the second set of zones (UF2, LF2, UA2, LA2) and not heating the third set of zones (UF3, LF3, UA3, LA3);
  during the second time period (t2), not heating the first set of zones (UF1, LF1, UA1, LA1) and not heating the third set of zones (UF3, LF3, UA3, LA3);
  during the third time period (t3), not heating the first set of zones (UF1, LF1, UA1, LA1) and not heating the second set of zones (UF2, LF2, UA2, LA2).

10. A method as set forth in claim 9, wherein the routine-deicing steps further comprise:
  intermittently heating the first upper fore zone (UF1),
  intermittently heating the first lower fore zone (LF1),
  intermittently heating the second upper fore zone (UF2),
  intermittently heating the second lower fore zone (LF2),
  intermittently heating the third upper fore zone (UF3),
  intermittently heating the third lower fore zone (LF3).

11. A method as set forth in claim 1, wherein the electrothermal device further comprises chordwise strips (IP) isolating adjacent inter-set zones, and wherein these zone-isolating strips (IP) are heated continuously during the routine-deicing steps.

12. A method as set forth in claim 11, wherein the zone-isolating strips (UPS, LPS) are continuously heated during the delay-rectifying steps.

13. A method as set forth in claim 1, wherein the intermittent heatingsteps are performed so three or less zones are intermittently heated at the same time.

14. A method as set forth in claim 13, wherein the intermittent heatingsteps are performed so two or less zones are intermittently heated at the same time.

15. A method as set forth in claim 14, wherein the intermittent heatingsteps are performed so only one zone is intermittently heated at a time.

16. A method as set forth in claim 1, wherein the delay-rectifying time period (t1) is based on an outside air temperature reading.

17. A method as set forth in claim 1, wherein the parting-strip continuously heating steps are performed at a temperature $T_{delay}$ during delay-rectifying steps and at a temperature $T_{deicing}$ during routine-deicing steps,
  wherein the delay-rectifying temperature $T_{delay}$ is greater than the routine-deicing temperature $T_{deicing}$.

18. A method as set forth in claim 17, wherein the delay-rectifying temperature $T_{delay}$ is greater than the routine-deicing temperature $T_{deicing}$ by at least about 30° F. and/or about 11° C.

19. A method as set forth in claim 1, wherein the parting strip (PS) has a width of between about 0.5 inch to about 1.0 inch and/or about 12 mm to about 26 mm.

* * * * *